United States Patent [19]
Dionne et al.
[11] 3,758,853
[45] Sept. 11, 1973

[54] METHOD OF AND APPARATUS FOR DETERMINING A TUNED FREQUENCY

[75] Inventors: William R. Dionne, Stevensville, Mich.; Philippe Blanc-Brude, Neuilly, France

[73] Assignee: Heath Company, St. Joseph, Mich.

[22] Filed: Mar. 20, 1972

[21] Appl. No.: 235,931

[52] U.S. Cl. ................................ 324/78 D, 325/455
[51] Int. Cl. ......................... G01r 23/02, H04b 1/06
[58] Field of Search ......................... 324/79 D, 78 D; 328/133; 325/363, 432, 455; 235/92 EV, 92 FQ; 331/64

[56] References Cited

UNITED STATES PATENTS 3,638,001 1/1972 Gordon ......................... 324/78 D X
3,627,996 12/1971 Vigour ......................... 235/92 EV X
3,244,983 5/1966 Ertman ......................... 324/79 D X

*Primary Examiner*—Alfred E. Smith
*Attorney*—William R. Sherman, Jerry Presson and Walter Kruger

[57] ABSTRACT

A method and apparatus for determining a tuned frequency of a radio by subtracting numerical counts of the frequencies of two oscillators from a numerical count of a high frequency oscillator (HFO). The several counts can also be added where the HFO has a frequency less than the tuned frequency.

18 Claims, 3 Drawing Figures

METHOD OF AND APPARATUS FOR DETERMINING A TUNED FREQUENCY

This invention relates to a method and apparatus for determining the precise frequency to which a multiconversion radio is tuned by counting and combining the frequencies of local oscillators and obtaining a result indicative of the tuned frequency.

BACKGROUND OF THE INVENTION

Prior art devices for determining the frequency to which a multiconversion radio such as a radio receiver is tuned customarily include a dial plate mechanically connected to one or more variable oscillators. Typically, as the tuning knob is turned, an oscillator is tuned and the dial plate turns to indicate the approximate tuned frequency. At high frequencies, and particularly with single side band signals, the dial only provides an approximate indication of the frequency to which the receiver is tuned. To enhance the ability of the operator to determine the frequency of the incoming signal, crystal calibrators are frequently used to enable the operator to calibrate the dial at spaced apart positions of the dial. For these calibrations to be of value, the oscillator must be linearly tunable, especially in multi-band receivers, and the usual Linear Master Oscillator is quite expensive.

In the more sophisticated presently used SSB receivers there are several conversion stages. Typically, there is a fixed frequency heterodyne or high frequency oscillator (HFO) which converts the incoming signal to a predetermined intermediate frequency, there is a tunable linear master oscillator (LMO) which converts the intermediate frequency to a second lower frequency, and there is a fixed frequency beat frequency oscillator (BFO) which converts the signal to the audio range. Usually the HFO and BFO are crystal controlled to obtain precise stable frequencies.

In most SSB receivers the HFO has a frequency higher than the tuned frequency of the receiver, and correspondingly, the tuned frequency equals the frequency of the HFO less the sum of the frequencies of the LMO and BFO.

In several presently used multi-conversion receivers the frequency of the HFO is less than the tuned frequency, and in these receivers the tuned frequency is the sum of the frequencies of the HFO, LMO, and BFO.

A significant portion of the high cost of multi-conversion receivers is attributable to the numerous crystals required to obtain precise HFO and BFO frequencies in multi-band receivers. This expense coupled with the high cost of the LMO which is needed to provide an accurate dial indication of the tuned frequency of the receiver forms a considerable portion of the cost of the receiver.

In the case of transceivers or multi-channel transmitters, costs are again quite high because of the requirement for crystal controlled oscillators to assure that the transmitter transmits at the required frequency. In many instances, the expensive crystals are required because the dial tuning system is not sufficiently accurate to indicate the transmitted frequency.

SUMMARY OF THE INVENTION

This invention provides a method and apparatus for determining the precise frequency to which a multiconversion radio receiver is tuned and for indicating the tuned frequency in the form of a numerical display. In the case of the usual multi-conversion receiver where the HFO has a frequency higher than the tuned frequency, the tuned frequency is determined by obtaining a numerical count indicative of the frequency of the HFO and subtracting numerical counts indicative of the frequencies of the LMO and BFO from the HFO count. By using such a digital technique a high accuracy on the order of 100 hertz can be attained for tuned frequencies as high as 35 MHZ.

Since the frequency of oscillation of the HFO, LMO and BFO can vary, and since it is desirable to apprise the operator about excessive variations, counts indicative of the frequency of oscillation of the HFO, LMO and BFO are taken during equal immediately adjacent time intervals several times a second and the result of subtracting the LMO and BFO frequencies from the HFO frequency is displayed several times each second. Any extreme variations in the count indicate to the operator that the receiver is drifting and that appropriate adjustments must be made. Correspondingly, the operator can immediately be apprised of faulty receiver operation.

In the type of receiver where the tuned frequency is the sum of the frequencies of the HFO, LMO and BFO, the tuned frequency is again accurately determined by obtaining a numerical count indicative of the frequencies of the HFO, BFO and LMO during consecutive equal time intervals and displaying the sum in digital form. In addition, in accordance with this invention, a precise digital indication of the frequency of oscillation of the HFO, LMO or BFO can readily be obtained.

Correspondingly, by using the method and apparatus of this invention the expensive LMO is no longer required, and in at least some instances, the crystal controlled HFO or BFO can be replaced by less expensive adjustable oscillators.

In addition, in accordance with the method and apparatus of this invention the tuned frequency of a transmitter can be accurately determined where the transmission frequency is equal to either the sum or difference of several oscillators of the transmitter.

Numerous other features and advantages of the invention will become apparent with reference to the accompanying drawings which form a part of this specification.

Figure 1:
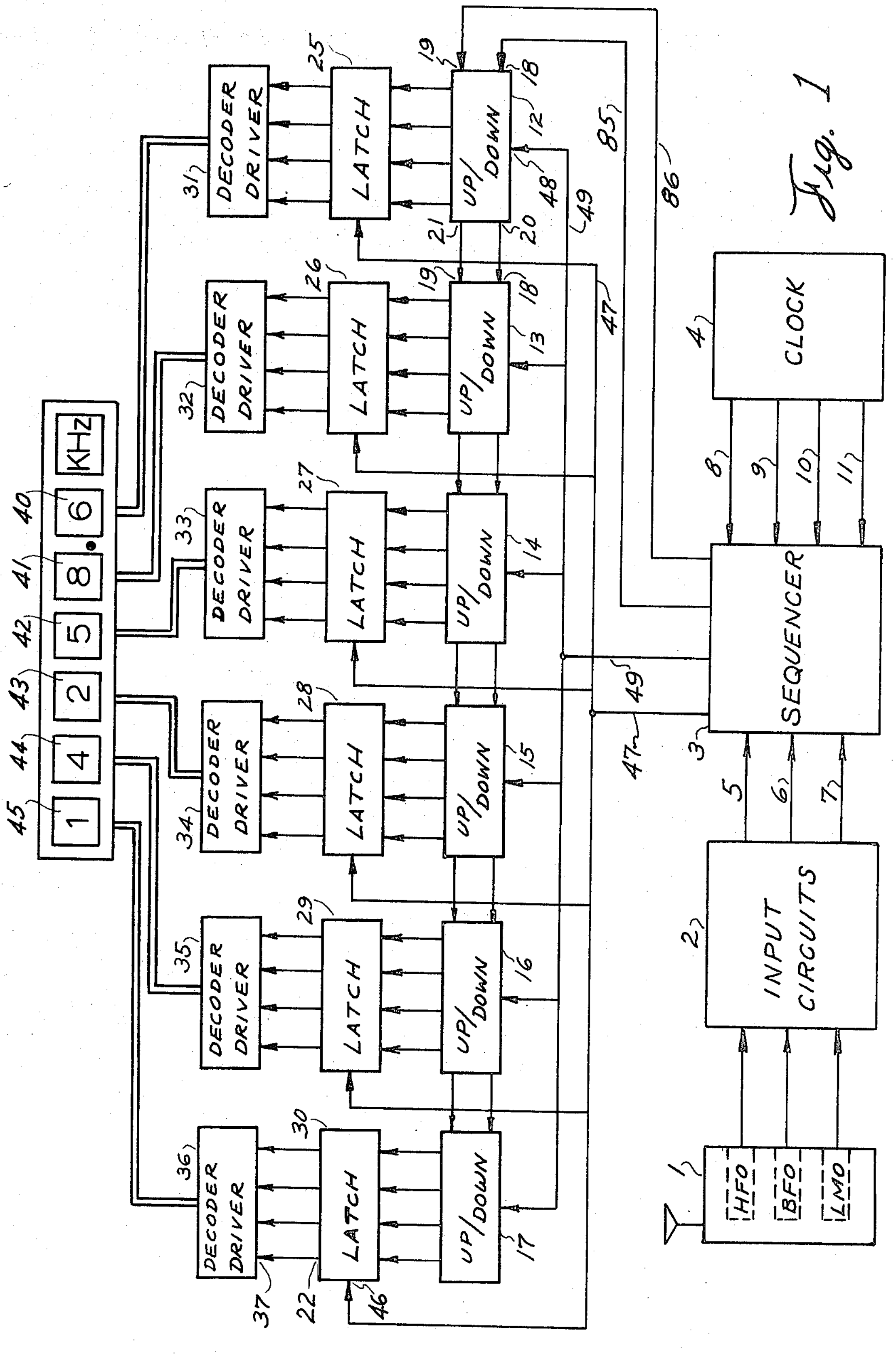
FIG. 1 is a block diagram of the apparatus of this invention.

Referring now to the drawings in detail and particularly to FIG. 1 there is shown a block diagram of the apparatus according to this invention and with which the method can be practiced. A radio receiver 1 is of the type having several local oscillators including an HFO at a first conversion stage, an LMO at a second conversion stage and a BFO at a third conversion stage. In this receiver which may be an SSB receiver model SB-303 available from Heath Company, Benton Harbor, Mich., the frequency to which the receiver is tuned is the sum of the frequencies of the LMO and BFO subtracted from the frequency of the HFO.

The apparatus for determining the frequency and displaying same includes high impedence input and shaper circuits 2, a sequencer 3, and a clock 4. The shaped pulses from input circuit 2 are fed to sequencer 3 over the lines 5–7. The sequencer 3 is controlled by clock 4 via the precisely timed outputs of the clock which are fed to the sequencer over the lines 8–11.

The counter system of the apparatus includes a plurality of synchronous four bit up/down BCD counters of the type having a dual clock input with clear. Typically, each of the up/down counters 12–17 can be an integrated circuit SN74192 available from Texas Instruments, Inc., Dallas, Tex. A characteristic of such counters is that each counter has a count up input 18 and a count down input 19. In addition, each counter has a carry terminal 20 and a borrow terminal 21. The counters 12–17 are connected together in cascade with the carry and borrow terminals of each counter connected respectively to the count up and count down terminals of the counter for the next more significant digit.

It will also be observed with reference to FIG. 1 that each up/down counter has four output terminals 22 at which appear the count in the counter in binary code decimal form. The four outputs 22 of counters 12–17 are connected respectively to "eight bit bistable latches", 25–30 which can be integrated circuits SN7475 available from Texas Instruments, Inc.

Each of the latches 25–30 has the characteristic of storing the count transferred from a counter until the latch is triggered to a transfer mode to receive the next count from the counter, which it again stores until a next transfer pulse is received. Hence, latches 25–30 act as buffer-storage devices. Each of the decoder-drivers 31–26 has four inputs 37 connected to the four outputs 22 of each of the respective latches 25–30. The decoder-drivers are each "BCD to decimal decoder/-drivers" and can be type SN74141, available from Texas Instruments, Inc. The decoder-drivers each have 10 outputs to drive 10 segment display devices which take the form of cold cathode display devices such as the NIXIE tubes 40–45.

As is apparent with reference to FIG. 1, the NIXIE tubes 40–45 display the count of the up/down counters 12–17 in digital numerical form. In this preferred embodiment of the apparatus, it is contemplated that the tuned frequencies to be determined will be in a range of approximately 3–38 MHZ. or correspondingly, 3,000–38,000 KHZ. The least significant digit, which is indicated by the NIXIE tube 40 indicates tenths of KHZ. and therefore, the numerical display is in KHZ. and can be read accurately within 100 HZ.

BRIEF DESCRIPTION OF OPERATION

Clock 4 supplies precisely timed signals to cause sequencer 3 to connect lines 5, 6, and 7 to up/down counter 12 in a predetermined sequence and to the appropriate up or down terminal of the counter. Specifically, the output of the HFO on line 5 is connected to up terminal 18 for a first time interval of 40 milliseconds, the output at line 6 from the LMO is connected to the count down terminal 19 of counter 12 for a 40 millisecond time interval immediately following the first interval, and the output on line 7 from the BFO is connected to the count down terminal 19 for a third 40 millisecond time interval immediately following the second time interval. During a fourth 40 millisecond time interval the counts in the cascaded counters 12–17 are transferred to the latches 25–30 by pulsing a transfer terminal 46 of each latch from a signal derived at sequencer 3 and appearing on line 47. This clears the latches and transfers the new count from the counters which the respective latches store to drive the decoder devices while the counters perform another count. During the same fourth 40 millisecond time interval, after the count has been transferred, counters 12–17 are reset by pulsing reset terminals 48 with a reset pulse from sequencer 3 which appears on line 49.

Because of the frequency limitations of the up/down counters 12–17, the frequencies appearing on lines 5, 6, and 7 are each divided by four in the sequencer so the counts appearing at the count up and count down terminals of counter 12 are the counts of the oscillations from the resepctive oscillators divided by four. However, since the oscillations from each oscillator are only permitted to be counted for a time interval of 40 milliseconds, the actual count in counters 12–17 for the least significant digit represents 100 HZ. Hence, the effect of dividing by four and applying the oscillations for time intervals of 40 milliseconds each is the equivalent of dividing by 100.

Since the count of the oscillations from the HFO is counted up in the counters 12–17 during the first 40 millisecond time interval and the counts of the oscillations of the LMO and BFO are counted down during the next two 40 millisecond time intervals, the count appearing in the counters 12–17 at the end of the third time interval is a numerical count (in binary code decimal form) of the frequency to which receiver 1 is tuned. This count from the respective counters 12–17 is transferred to the latches 25–30 which maintain the decoder-drivers 31–36 and the display tubes 40–45 energized constantly except for the very brief time interval required to transfer the count from the counters to the latches. Correspondingly, the output at display tubes 40–45 is a constant nonflickering numerical display which can be read accurately.

The apparatus of FIG. 1 can also be used to add the frequencies appearing at lines 5, 6, and 7. This is accomplished by manipulating several switches in the sequencer so the oscillations from each of the inputs appears at the count up terminal 18 only of the counter 12. This permits using the apparatus to determine the tuned frequency of a radio where the frequency of the HFO is less than the tuned frequency.

DETAILED DESCRIPTION OF OPERATION

Figure 2:
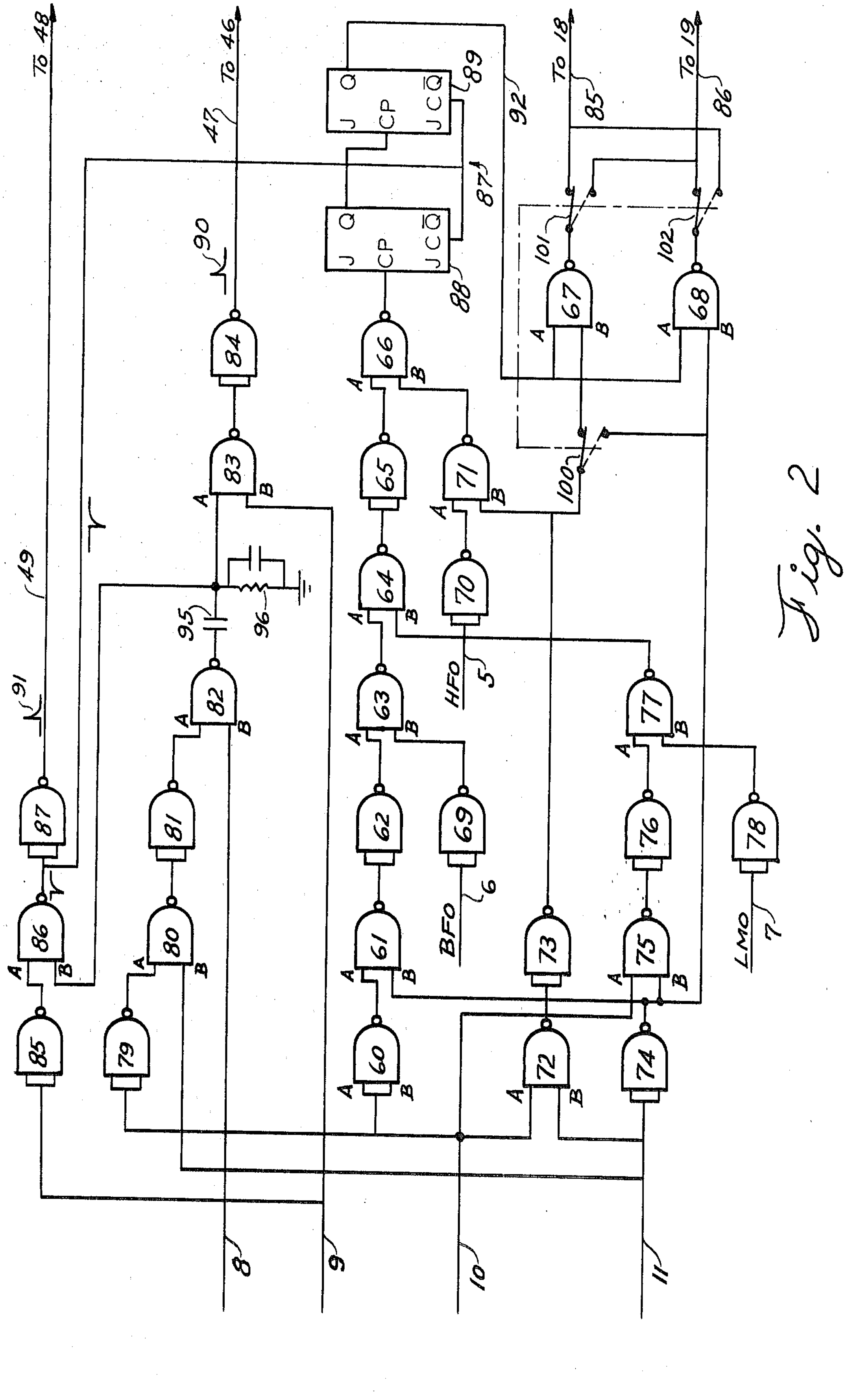
FIG. 2 is a schematic showing the logic of the sequencer of FIG. 1.
Figure 3:
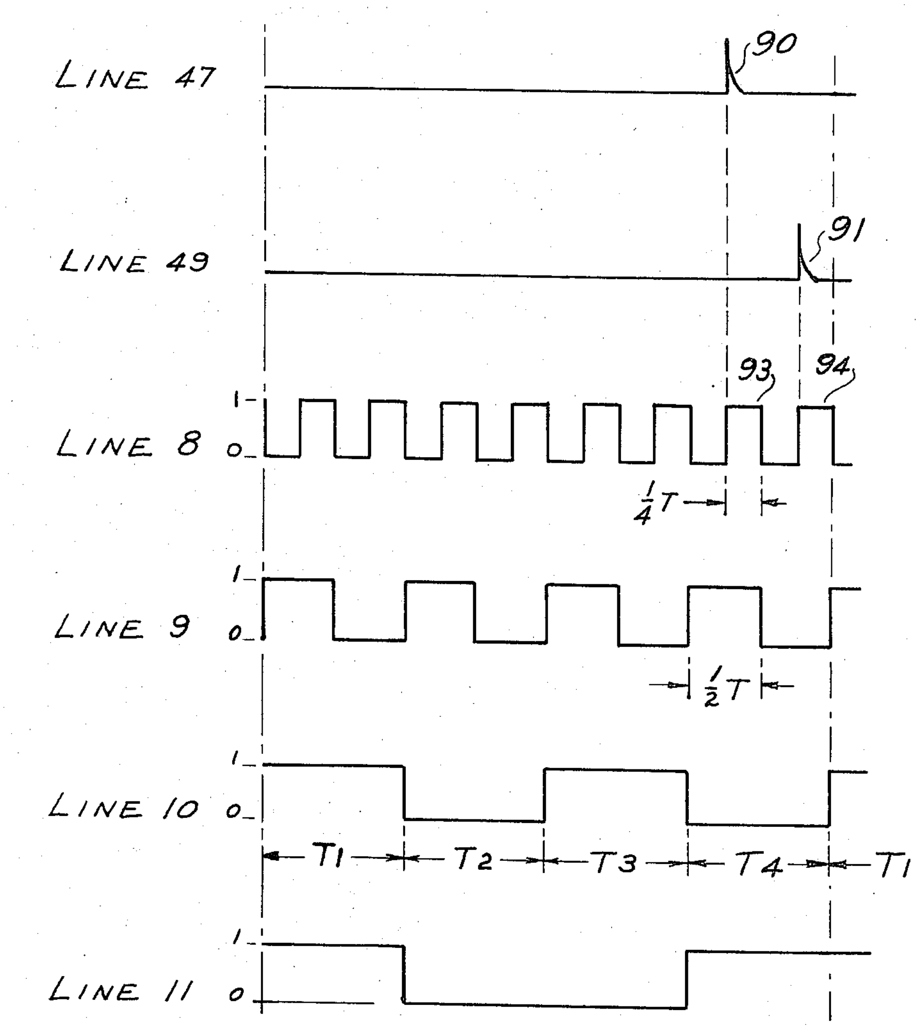
FIG. 3 is a graph showing the time sequence of the counting and display operations.

Referring now to FIGS. 1 and 2, clock 4 includes a 1 MHZ crystal, the signal from which is divided by a divider chain within the clock to provide precise frequencies on lines 8–11. The outputs of the clock appearing on the respective lines 8–11 are 50 HZ, 25 HZ, 12.5 HZ, and 6.25 HZ. The relationship of the outputs on lines 8–11 is shown at FIG. 3 and will subsequently be described in detail.

FIG. 2 shows the logic for the sequencer. As is apparent, sequencer 3 includes a plurality of nand logic gates connected between input lines 5–7 and counter 12. The output lines 8–11 of clock 4 are connected to and control the states of the nand gates of the sequencer.

To facilitate explanation, the inputs of each nand gate are designated by the letters A and B and the output of each gate is designated by the letter C. It will be observed that some nand gates such as nand gate 60 have the A and B inputs connected together. The gates which have the A and B inputs connected together perform an inverter function.

As is well known, a two input nand gate produces a logic 0 output only when both inputs are at a logic 1 level. For all other 1 and 0 conditions of the inputs the output is logic 1. As shown at FIG. 2, sequencer 3 includes nand gates 60–84 which are controlled by the inputs from lines 8–11 of the clock and to cause only preselected signal frequencies to appear at output lines 85 and 86, so the counter 12 will count in the proper direction. Included in the logic circuitry is a prescaler 87 in the form of series connected JK flip-flops 88 and 89. These flip-flops are connected together to perform a divide by four function so the count at the output of flip-flop 89 is one-quarter the count at the input to flip-flop 88.

Nand gates 60–78 are controlled by the outputs of the clock on lines 10 and 11 to switch the sequencer logic so the oscillations on lines 5, 6, and 7 are connected to output lines 85 and 86 in the proper sequence. This sequence is as follows. During the first time interval T1 (FIG. 3), line 5 on which the HFO signal appears is connected to the count up lead 85, during the second time interval T2, line 6 from the BFO is connected to the count down line 86, and during the third time interval T3, line 7 from the LMO is connected to cound down line 86. During a fourth time interval T4, transfer and reset pulses appear respectively on lines 47 and 49 from the respective nand gate chains 79–84 and 85–87 and these pulses are produced as a result of the clock outputs appearing on lines 8 and 9. As will subsequently be described in detail, transfer pulse 90 occurs during the first half of time interval T4 and reset pulse 91 occurs during the second half of the time interval T4.

The manner in which the oscillations appearing on line 5 from the HFO are counted up in the counter during time interval T4 will now be explained. In order to cause counter 12 to count up a logic 1 must appear at the count down terminal while a signal frequency is applied to count up terminal 18. Nand gate 67 must be in a state to connect the output from flip-flop 89 to the count up line 85 which is connected to the count up terminal 18 of counter 12. Since the output of flip-flop 89 is connected to both A inputs of nand gates 67 and 68, nand gate 68 must be in a disabled state where it will not pass the signal frequency and where it will have a logic 1 output. This is accomplished by maintaining the B input of gate 68 at a logic 0 level so the output is logic 1. To pass the signal frequency from flip-flop 89 input B of gate 67 must be logic 1 so the output will be the signal frequency at input A.

Table 1 shows the states of the various inputs and outputs of the nand gates to perform the appropriate gating to the up and down terminals 18 and 19 during the time intervals T1–T4.

TABLE 1.—STATES OF INPUT TERMINALS A AND B AND OUTPUT C OF GATES FOR FUNCTION HFO-BFO-LMO

[HF is HFO Signal, BF is BFO Signal, LM is LMO Signal, T is Transfer Pulse, R is Reset Pulse]

| GATE | | T1 A | T1 B | T1 C | T2 A | T2 B | T2 C | T3 A | T3 B | T3 C | | T4 A | T4 B | T4 C |
|---|---|---|---|---|---|---|---|---|---|---|---|---|---|---|
| 60 | | 1 | 1 | 0 | 0 | 0 | 1 | 1 | 1 | 0 | | 0 | 0 | 1 |
| 61 | | 0 | 0 | 1 | 1 | 1 | 0 | 0 | 1 | 0 | | 1 | 1 | 0 |
| 62 | | 1 | 1 | 0 | 0 | 0 | 1 | 1 | 1 | 0 | | 0 | 0 | 1 |
| 63 | | 0 | BF | 1 | 1 | BF | BF | 0 | BF | 0 | | 1 | BF | BF |
| 64 | | 1 | 1 | 0 | BF | 1 | BF | 1 | LM | LM | | BF | 1 | BF |
| 65 | | 0 | 0 | 1 | BF | BF | BF | LM | LM | LM | | BF | BF | BF |
| 66 | | 1 | HF | HF | BF | 1 | BF | LM | 1 | LM | | BF | 1 | BF |
| 67 | | HF | 1 | HF | BF | 0 | 1 | LM | 0 | 1 | | BF | 0 | 1 |
| 68 | | HF | 0 | 1 | BF | 1 | BF | LM | 1 | LM | | BF | 0 | 1 |
| 69 | | BF | BF | BF | BF | BF | BF | BF | BF | BF | | BF | BF | BF |
| 70 | | HF | HF | HF | HF | HF | HF | HF | HF | HF | | HF | HF | HF |
| 71 | | HF | 1 | HF | HF | 0 | 1 | HF | 0 | 1 | | HF | 0 | 1 |
| 72 | | 1 | 1 | 0 | 0 | 0 | 1 | 1 | 0 | 1 | | 0 | 1 | 1 |
| 73 | | 0 | 0 | 1 | 1 | 1 | 0 | 1 | 1 | 0 | | 1 | 1 | 0 |
| 74 | | 1 | 1 | 0 | 0 | 0 | 1 | 0 | 0 | 1 | | 1 | 1 | 0 |
| 75 | | 1 | 0 | 1 | 1 | 0 | 1 | 1 | 1 | 0 | | 0 | 0 | 1 |
| 76 | | 1 | 1 | 0 | 1 | 0 | 0 | 0 | 0 | 1 | | 1 | 1 | 0 |
| 77 | | 0 | LM | 1 | 0 | LM | 1 | 1 | LM | LM | | 0 | LM | 1 |
| 78 | | LM | LM | LM | LM | LM | LM | LM | LM | LM | | LM | LM | LM |
| 79 | | 1 | 1 | 0 | 0 | 0 | 1 | 1 | 1 | 0 | | 0 | 0 | 1 |
| 80 | | 0 | 1 | 1 | 1 | 0 | 1 | 0 | 0 | 1 | | 1 | 1 | 0 |
| 81 | | 1 | 1 | 0 | 1 | 1 | 0 | 1 | 1 | 0 | | 0 | 0 | 1 |
| 82 | T/2 [1] | 0 | T | 1 | 0 | T | 1 | 0 | T | 1 | | 1 | T | T |
| | T/2 [2] | 0 | T | 1 | 0 | T | 1 | 0 | T | 1 | | 1 | T | T |
| 83 | T/2 [1] | 0 | 1 | 1 | 0 | 1 | 1 | 0 | 1 | 1 | | T | 1 | T |
| | T/2 [2] | 0 | 0 | 1 | 0 | 0 | 1 | 0 | 0 | 1 | | T | 0 | 1 |
| 84 | | 1 | 1 | 0 | 1 | 1 | 0 | 1 | 1 | 0 | T/2 [1] | T | T | T |
| | | | | | | | | | | | T/2 [2] | 1 | 1 | 0 |
| 85 | T/2 [1] | 1 | 1 | 0 | 1 | 1 | 0 | 1 | 1 | 0 | | 1 | 1 | 0 |
| | T/2 [2] | 0 | 0 | 1 | 0 | 0 | 1 | 0 | 0 | 1 | | 0 | 0 | 1 |
| 86 | T/2 [1] | 0 | 0 | 1 | 0 | 0 | 1 | 0 | 0 | 1 | | 0 | T | 1 |
| | T/2 [2] | 1 | 0 | 1 | 1 | 0 | 1 | 1 | 0 | 1 | | 1 | T | R |
| 87 | T/2 [1] | 1 | 1 | 0 | 1 | 1 | 0 | 1 | 1 | 0 | | 1 | 1 | 0 |
| | T/2 [2] | 1 | 1 | 0 | 1 | 1 | 0 | 1 | 1 | 0 | | R | R | R |

[1] First ½ of time interval T.
[2] Second ½ of time interval T.

With reference to Table 1 and FIGS. 2 and 3, the operation of the sequencer will now be explained. The signal frequency from HFO line 5 is inverted in nand gate 70 and is gated by nand gate 71 because the B input of gate 71 is at a logic 1 level. The HFO signal thus appearing at input B of gate 66 is also gated by nand gate 66 bacause its A input is at a logic 1 level. The HFO signal then passes through prescaler 87 to terminal A of nand gate 67 which passes the signal frequency to line 85 and to count up terminal 18 because the clock output at lines 10 and 11 is logic 1 which causes the output of gate 72 to be logic 0 so the output of gate 73 is logic 1. At the same time, the logic 1 output on line 11 is inverted to logic 0 by gate 74 so the B input of gate 68 is logic 0 and the HFO signal on line 92 from prescaler 89 is therefore blocked by clock 68. During time interval T1 the signal on line 6 from the BFO is blocked by gate 63 before it reaches gate 66. In this regard it will be noted that the output of gate 62 is logic 0 because gate 61 has a 1 output as a result of a logic 0 at input A from gate 60, which has a logic 1 input from line 10. The B terminal of gate 61 has a logic 1 input as a result of the logic 0 from gate 74 resulting from the logic 1 at line 11. Hence, gate 63 inhibits or blocks the signal from line 6 during time interval T1, because its output is 1 whenever both inputs are not 1.

During time interval T1 the signal of the LMO on line 7 is also blocked. Such blocking is performed by nand gate 77 which has a 0 A input from nand gate 76. The 0 A input of gate 76 results from the logic 1 at input A of gate 75 from line 10 and the logic 0 at input B of gate 75 from gate 74 because of the logic 1 level on line 11.

Time intervals T1, T2, T3, and T4 are each of 40 milliseconds duration, one following immediately after the other. During the time interval T1 the signal on HFO line 5 appears at the count up terminal 18 of counter 12. During time interval T2, it can be determined from Table 1 that the signals from lines 5 and 7 are blocked and that the BFO signal from line 6 appears at line 92 at the A inputs of gates 67 and 68. Table 1 also shows that at time interval T2, terminal B of gate 67 is at logic 0 and hence, it blocks the signal frequency appearing at input A and applies a 1 output to count up terminal 19 of counter 12. The B input of gate 68 is at a logic 1 level and it is therefore enabled to pass the BFO signal along line 86 to the count down terminal 19. Hence, during time interval T2 the BFO signal appears at the count down terminal and its count is subtracted from the HFO count in the counter.

It can also be determined from Table 3 that the HFO and BFO signals on lines 5 and 6 are blocked during time interval T3 and that the signal from LMO line 7 is passed by gate 68 to the count down terminal via line 86.

During time interval T4 the signal frequencies at lines 5, 6, and 7 are all blocked because the B input terminals of gates 67 and 68 are maintained at a logic zero level.

During this fourth time interval the outputs of lines 8 and 9, and nand gates 79–82 and 85–87 generate transfer pulse 90 and reset pulse 91. With reference to FIG. 3 and the time interval T4, it can be seen that clock 4 generates a logic 1 level at line 9 during the first half of T4 and a logic 0 level at line 9 during the second half of T4. During the time interval T4 line 10 has a logic 0 level. Line 8 initially has a logic 0 level which changes to a logic 1 level during the first half of T4 and has a logic 0 level which changes to a logic 1 level during the second half of T4. These logic 1 levels are designated 93 and 94 respectively at FIG. 3.

The manner in which the transfer and reset pulses are generated will now be explained with reference to Table 1. During the first half of T4 the output of gate 79 is logic 1 because line 10 provides a logic 0 at its input. As a result of the logic 1 at the A input of gate 80, and logic 1 at the B input of gate 80 its output is logic 0 and the output of gate 81 is logic 1. When line 8 changes from logic 0 to logic 1 it produces a pulse which is differentiated by capacitor 95 and resistor 96. This short duration pulse appears at input A of gate 83 while the gate has a logic 1 input from line 9 at B so the state of gate 83 changes causing the state of gate 86 to change to produce the transfer pulse 90. Transfer pulse 90 is conducted to reset terminals 46 of latches 25–38 by transfer line 47 which enables the latches to receive the count in counters 12–17. Transfer pulse 90 is of short duration so the transfer occurs in a very short time period and the latches then remain latches and store the information from the counters until the next transfer pulse is received.

During the second half of time interval T4 when pulse 94 appears at input B of gate 82, the signal at the output of gate 82 is again differentiated by capacitor 95 and resistor 96. During the second half of time interval T4 line 9 is at logic 0 so the output of gate 85 is logic 1 and the A input of gate 86 is logic 1. When the pulse from the output of gate 82 appears at input B of gate 86 the gate switches momentarily to cause gate 87 to switch momentarily to produce the reset pulse 91 at each of the reset terminals 48 of counters 12–17 via line 49. Reset pulse 91 resets each of counters 12–17 to a 0 state.

The pulse from the output of gate 86 also resets prescaler 87 by applying the pulse to the clear terminals of flip-flops 88 and 89.

From Table 1 it can be shown that neither transfer pulse 90 nor reset pulse 91 appear on lines 47 or 49 during time intervals T1, T2, or T3.

The logic of sequencer 3 can be quite simply changed so the signal frequencies at lines 5, 6, and 7 are counted up during the time intervals T1, T2, and T3 so the up/-down counter performs strictly an addition function. This is accomplished by providing switches 100, 101, and 102.

Switches 100–102 are each single pole double throw switches which may be operated in unison by a common actuator. In the solid line positions the apparatus operates in the manner previously described where the HFO signal is counted into the counter during the time interval T1, the BFO signal is subtracted from the count in the counter during the time interval T2, and the LMO signal is subtracted from the count in the counter during the time interval T3. When switches 100–102 are moved to the dotted line position of FIG. 3 the effect is to connect the output of gate 67 via the count down line 86 to the count down terminal 19 of the counter, connect the output of gate 68 to the count up line 85 and the count up terminal 18 of the counter, and to connect the output of gate 73 to input B of gate 68. With switch 100 in the dotted line position input B of gate 67 is always 0 and passes no count signal. In addition, with switch 100 in the dotted line position the B input of gate 68 is always logic 1 as a result of the outputs from gates 73 and 74.

Correspondingly, if it is desired to add the oscillations of the HFO, BFO, and LMO it is merely necessary to change the positions of the switches 100–102 to the dotted line positions of FIG. 3.

While the method and apparatus of this invention has been described with regard to an SSB type receiver, the technique disclosed herein can also be used to determine precise tuned frequencies for CW and RTTY modes of operation of the radio, be it a receiver or a transmitter. In addition, the apparatus can also be used to obtain the sum or difference of frequencies from any frequency sources where a numerical display is desired. The apparatus can also be used to obtain a numerical display of a single frequency simply by connecting only one frequency source to the apparatus.

Since each time interval is 40 milliseconds and since the prescaler divides each of the signals by a factor of 4, the result appearing in the counter is the actual count of each frequency divided by 100.

While a preferred embodiment of the method and apparatus of this invention have been shown and described in detail it is to be understood that changes can be made without departing from the scope of this invention as set forth herein and defined in the appended claims.

What is claimed is:

1. A method for determining the tuned frequency of a multiconversion radio comprising, in combination, obtaining a numerical count indicative of the frequency of oscillation of a first local oscillator of the radio; obtaining a numerical count indicative of the frequency of oscillation of a second local oscillator of the radio; combining said counts in a predetermined algebraic sense; and displaying the resulting number.

2. A method according to claim 1 wherein the method further includes the step of obtaining a numerical count indicative of the frequency of oscillation of a third local oscillator of the radio; and combining the count from the third oscillator with the counts from the first and second oscillators in a predetermined algebraic sense.

3. A method according to claim 2 wherein the step of combining the counts in a predetermined algebraic sense includes subtracting the numerical counts from the second and third oscillators from the numerical count of the first oscillator.

4. A method according to claim 2 wherein the step of combining the counts in a predetermined algebraic sense includes adding the counts from the first, second and third oscillators.

5. A method according to claim 1 wherein said step of obtaining a numerical count indicative of the frequency of oscillation of a first local oscillator includes obtaining the count during a first time interval of a time period, said step of obtaining a numerical count indicative of the frequency of oscillation of the second local oscillator includes obtaining a numerical count during a second time interval of said time period, said second time interval immediately following said first time interval; and said step of obtaining a numerical count indicative of the frequency of oscillation of the third local oscillator includes obtaining a numerical count during a third time interval of said time period, said third time interval immediately following said second time interval.

6. A method according to claim 5 wherein said time intervals are of equal time duration.

7. A method according to claim 6 wherein said steps of obtaining a numerical count indicative of the frequencies of the first, second, and third oscillators includes, obtaining said numerical counts several times a second; and said step of displaying the number indicative of the result includes displaying the result of an immediately preceding counting operation while performing a counting operation.

8. A method for determining the tuned frequency of a multiconversion radio having local oscillators including a high frequency oscillator, a second frequency oscillator, and a beat frequency oscillator comprising, in combination, obtaining a numerical count indicative of the frequency of oscillation of the high frequency oscillator during a first time interval, obtaining a numerical count indicative of the frequency of oscillation of the second frequency oscillator during a second time interval; obtaining a numerical count indicative of the frequency of oscillation of the beat frequency oscillator during a third time interval; subtracting the counts of the second frequency oscillator and the beat frequency oscillator from the count of the high frequency oscillator; and displaying a number indicative of the result.

9. A method according to claim 8 wherein said steps of obtaining numerical counts of the high frequency oscillator, second frequency oscillator, and beat frequency oscillator include prescaling each of said counts by the same factor.

10. A method according to claim 8 wherein said counts are obtained during first, second and third time intervals of equal time duratin, one immediately following the other, said counts are repeated during successive time periods; and the number indicative of the result obtained from an immediately preceding count is displayed while performing the next counting operation.

11. A method according to claim 9 wherein said steps of obtaining the counts includes obtaining the counts during equal millisecond time intervals each of which is an integer multiple of said prescaling factor.

12. Apparatus for determining the tuned frequency of a multiconversion radio wave device, comprising, in combination, first means for deriving a numerical count indicative of the frequency of oscillation of a first local oscillator of the radio device; second means for deriving a numerical count indicative of the frequency of oscillation of a second local oscillator of the radio device; additional means for combining said counts in a predetermined algebraic sense; and means responsive to said additional means for displaying a number indicative of the tuned frequency of the radio device.

13. Apparatus according to claim 12 wherein the apparatus further includes, third means for deriving a numerical count indicative of the frequency of oscillation of a third local oscillator of the radio device; and wherein, said additional means for combining said counts includes means for combining the counts from the first, second and third means in a predetermined algebraic sense.

14. Apparatus according to claim 13 wherein said apparatus further includes sequencer means for connecting the signals from said first, second and third means to said additional means in a predetermined sequence.

15. Apparatus according to claim 14 wherein said sequencer means includes means for connecting the signals from said first, second and third means to said combining means for equal time intervals.

16. Apparatus for determining the tuned frequency of a multiconversion radio wave device comprising, in combination, first means for deriving a signal indicative of the frequency of oscillation of a first local oscillator of the radio device; second means for deriving a signal indicative of the frequency of oscillation of a second local oscillator of the radio device; and additional means for combining the signals from the first and second means in a predetermined algebraic sense to derive a signal indicative of the tuned frequency of the radio wave device.

17. Apparatus according to claim 16 wherein said apparatus further includes, display means responsive to said additional means for displaying a result indicative of the tuned frequency of the radio wave device.

18. Apparatus according to claim 16 wherein said first means derives a pulse train signal indicative of a numerical count of the frequency of oscillation of the first local oscillator of the radio device; said second means derives a pulse train signal indicative of a numerical count of the frequency of oscillation of the second local oscillator of the radio device; and said additional means includes counter means combining the numerical counts from said first and second means in a predetermined algebraic sense.

* * * * *